H. J. MURRAY.
ELECTRIC GEAR SHIFTING MECHANISM.
APPLICATION FILED JULY 15, 1914.

1,268,263.

Patented June 4, 1918.
2 SHEETS—SHEET 1.

WITNESSES
Geo. Schwarz
M. J. Cooper.

INVENTOR
Howard J. Murray.
BY
Mortimer Austin
ATTORNEYS

H. J. MURRAY.
ELECTRIC GEAR SHIFTING MECHANISM.
APPLICATION FILED JULY 15, 1914.

1,268,263.

Patented June 4, 1918.
2 SHEETS—SHEET 2.

WITNESSES

INVENTOR
Howard J. Murray.
BY
ATTORNEYS

UNITED STATES PATENT OFFICE.

HOWARD J. MURRAY, OF BROOKLYN, NEW YORK.

ELECTRIC GEAR-SHIFTING MECHANISM.

1,268,263.  Specification of Letters Patent.  Patented June 4, 1918.

Application filed July 15, 1914. Serial No. 851,063.

*To all whom it may concern:*

Be it known that I, HOWARD J. MURRAY, a citizen of the United States, and resident of Brooklyn, in the county of Kings and State of New York, have invented certain new and useful Improvements in Electric Gear-Shifting Mechanism, of which the following is a specification.

My invention relates to improvements in gear shifting mechanism for self-propelled vehicles and relates particularly to electrically controlled means for shifting the transmission gears and for holding the same in their adjusted position.

One of the main objects of my invention is to provide a mechanism wherein a reversible electric motor may be employed to produce a plurality of gear changes both when running in a forward and in a reverse direction, and which may be cut out when the change gear has been shifted into intermeshed position.

A further object of the invention consists in providing means whereby the shift rod controlling the change gear may be locked in its operative position and held against accidental displacement.

A further object of the invention is to provide a new and improved form of control lever which may be mounted in any suitable position, as for example on the top of the steering wheel of the vehicle.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

In the accompanying drawings:—

Figure 1:
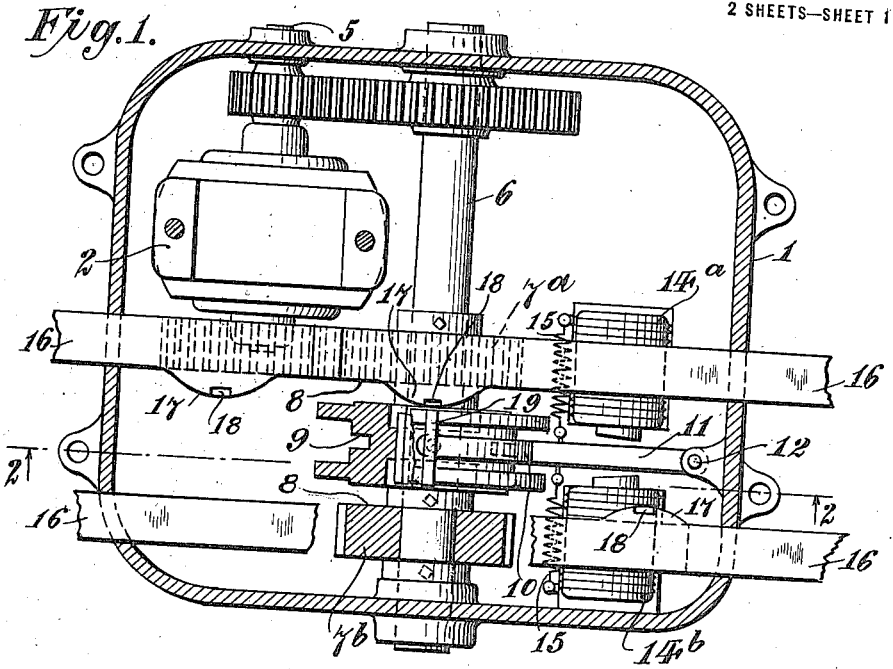
Figure 1 represents a plan view partly in section of my improved gear shifting mechanism.
Figure 2:
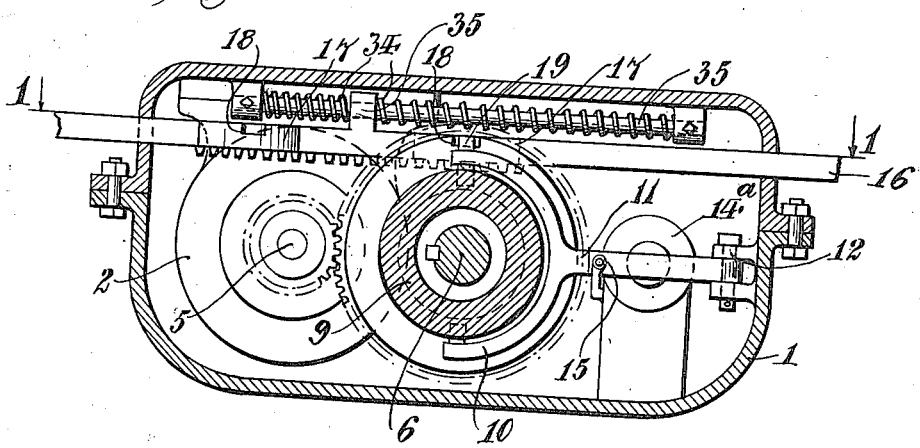
Fig. 2 represents a section on the lines 2—2 of Fig. 1.

The gear shift mechanism may be mounted in any suitable location on the vehicle and is inclosed within a suitable casing 1 made in one or more parts to permit access thereto. The motor 2 has its field normally connected with a battery 3, or other source of power through a snap switch 4. Said motor is a reversible motor adapted to run either in a forward or reverse direction and the motor shaft 5 is geared to a driving shaft 6 mounted within the casing. Said shaft is provided with two pinions 7$^a$ and 7$^b$ loosely mounted thereon and provided with clutch members or friction surfaces 8 on their inner and adjacent faces. Said pinions are spaced apart to admit a shiftable clutch member 9 between them that is keyed to the shaft in any well-known manner to permit movement thereof. The said clutch member may be operated through a yoke 10 secured to or formed integral with a link 11 pivoted to the casing as at 12.

The clutch member is operated automatically by two magnets 14$^a$ and 14$^b$ arranged on opposite sides of the link so that the clutch member can be thrown from one side to the other to engage with the gears 7$^a$ and 7$^b$ as one or the other of the magnets is energized. Balanced springs 15 normally return the clutch to its non-operative position after the magnets have been deënergized.

The shift rods 16 are normally in mesh with the pinions 7$^a$ and 7$^b$ and are operatively connected with the change speed gears (not shown). Each of said shift rods is provided on its inner face with a plurality of curved bearing surfaces 17 so positioned that one will be opposite the clutch member and preferably above the shaft 6 when any gear controlled by said rod is in its operative or intermeshed position. A locking groove or notch 18 is provided in each bearing surface adapted to receive a locking bar 19 that is mounted on the yoke 10 of the clutch and is forced into the notch when said notch and bar register with each other and thus hold the shift rods against displacement.

The supply of current to the motor and to the magnets is controlled by the control lever 20 that may be mounted as shown directly on top of the steering wheel of the vehicle, although it is obvious that it may be located in any other desired position. Said lever comprises a universal joint 21 preferably formed by a ball and socket connection whereby it may be shifted forward and back and to the right and the left. Two contact members 22, 23 are provided for each position of the lever, one of said contact members being connected to the motor and the other being connected to the magnets 14ª and 14ᵇ. The contact members are preferably inclosed and the lever is protected and guided by a suitable cover 24 provided with slots for the lever, said cover being secured to a base 25 that supports the contacts and the lever.

Figure 3:
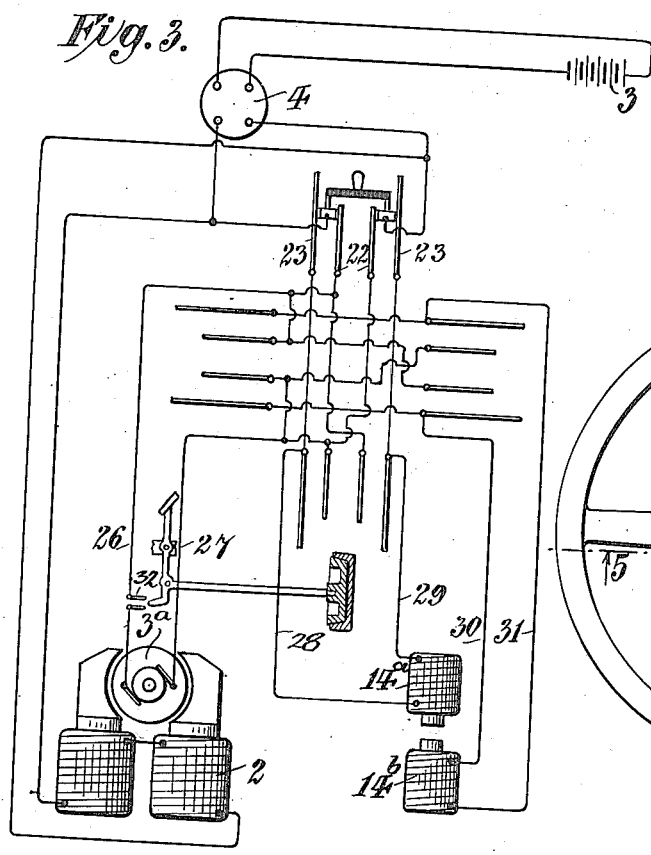
Fig. 3 is a diagrammatic view of the mechanism and electrical connections.
Figure 4:
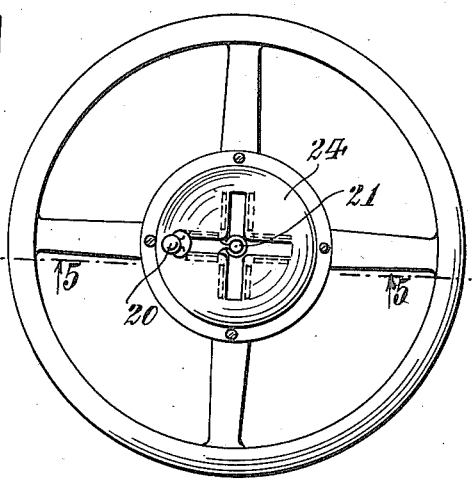
Fig. 4 represents a plan view of the steering wheel.
Figure 6:
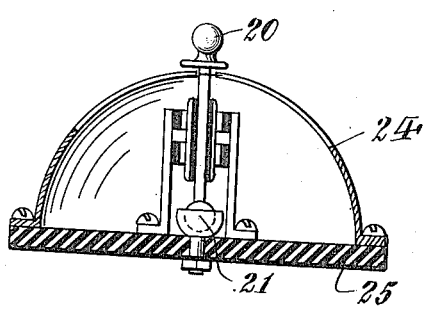
Fig. 6 is an end view partly in section of the control lever.

The separate contacts and their connections permit various combinations to be made with respect to the motor and the magnets. Assuming the current to be flowing from the battery 3 through the field of the motor and the contacts 22 to be connected with the armature 3ª of the motor and the contacts 23 to be connected with the magnets 14ª and 14ᵇ, if the control lever is moved from its neutral position to the position indicated in Fig. 3, then the current will flow through the connections 26 and 27, causing the motor to rotate in its forward direction and the magnet 14ª will be energized through the connections 28 and 29, thus shifting the clutch member toward said magnet and causing the shift rod to be actuated to give reverse speed. When the control lever is thrown to the opposite position, then the direction of the current through the armature of the motor will pass through the connections 27, 26, thus causing the motor to rotate in the opposite direction, and giving first speed ahead. When the lever is shifted from its neutral position to the right as shown in Fig. 3, then the current will be caused to pass through the armature by the connections 26, 27 so that the motor will rotate the same or reverse direction and magnet 14ᵇ is energized through the connections 30, 31 so that the clutch member is shifted toward the magnet 14ᵇ which gives second speed ahead. When, however, the control lever is shifted to the left in Fig. 4, then the direction of the current through the armature of the motor is ahead and the magnet 14ᵇ is energized, thus giving third speed.

The contacts connecting the motor and the magnets are preferably disposed with relation to each other so that the magnets are energized first and then the motor is energized. These contacts are preferably so arranged also that the motor will be cut out automatically as the lever is moved toward the end of its stroke, but the magnets are always kept in circuit to hold the shift rods in adjusted position until the lever is moved to its neutral position.

Preferably a cut out switch 32 is provided in the armature circuit which switch may be of any conventional design and may be either manually controlled or controlled automatically by the clutch or other mechanism of the vehicle (not shown) which cuts off all power to the armature when the clutch is thrown out. When the power is cut off from the magnets the shift rods are immediately returned to their neutral position by suitable means as the springs 34 mounted on a stationary rod 35 supported by the casing and being connected with the shift rods in any suitable manner, as the lug or ear 35.

Figure 5:
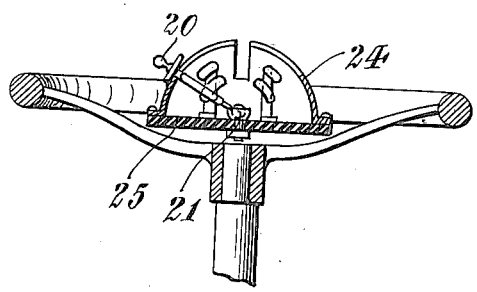
Fig. 5 is a sectional view on the lines 5—5 of Fig. 4.

In operation, the control lever is moved to the desired position to close the circuits which energize the magnets and cause the motor to rotate in the predetermined direction that will give the desired change of speed. Assuming the parts to be in the neutral position shown in Fig. 1 and the switch thrown to make the electric connections indicated diagrammatically in Fig. 3, a description of the device under this condition will be sufficient for the operation of the device in any position of the switch in making its selective throws of the different change gear combinations. As before stated this connection will cause the motor to rotate in its forward direction and will cause the magnet 14ª to be energized. This energized magnet will act on the link 11 and act therethrough to slide the shiftable clutch members toward the adjacent gear shifting rod 16 and operatively connect the rotating shaft 6 with the said rod 16 through the engagement of the friction surfaces 8. At the same time the locking bar 19 is forced into engagement with the inclined bearing surface 17 so that when the rod 16 has been shifted to bring the notch opposite the recess 18 the gears will be in mesh. As soon as the gears are meshed, the operator continues the throw of the lever to the end of the slot, which acts to break the connection with the motor (see Fig. 5) but continues the connection with the electromagnet. This interrupts the motion of the motor but maintains the electromagnets energized.

The final movement of the rod 16 is to cause the incline 17 to wedge or cam the clutch member 9 out of engagement with the pinion 7ª and thus break the frictional engagement between the motor driven shaft 6 and the shift rod. As long as the magnet 14ª remains energized, the rod 16 will be locked in its shifted position due to the holding of the latch 19 in the recess 18. As soon as the magnet is deënergized by returning the lever to its neutral position or by operation of the automatic cut out, if the same is employed, the shift rod is returned to its original position by the springs 34.

By means of this construction, I am enabled to provide a simple and compact mechanism in which four different speeds, comprising three forward speeds and one reverse speed, may be obtained through a single motor coöperating with suitable clutch mechanism to utilize movement of the motor both in forward and in reverse directions. The clutch is automatically disconnected as soon as the change gears are brought into the desired operative relation and further movement of the shift lever cuts out the motor, thus saving the current, but even if the motor should be permitted to continue in operation, no harmful result could occur except needless waste of current.

While I have shown and described and have pointed out in the annexed claims certain novel features of my invention, it will be understood that certain well known mechanical equivalents of the elements illustrated may be used, and that various other substitutions, omissions and changes in the form and details of the device illustrated and in its operation may be made by those skilled in the art without departing from the spirit of the invention which is indicated in the following claims.

I claim as my invention:—

1. In a gear shifting mechanism, the combination with a gear shift rod, of a motor operatively connected therewith to move the same in opposite directions from a neutral position, a clutch between the shift rod and motor, a single control lever for the motor and the clutch, and means for automatically returning the shift rod to its neutral position independently of the motor.

2. In a gear shifting mechanism, the combination with a gear shift rod, of a driving pinion operatively connected with said rod, a reversible electric motor connected with said pinion to drive the same and the rod in contrary directions, a clutch between said pinion and motor, and electrically controlled means for actuating said clutch and separate means for automatically returning the clutch to its initial position.

3. In a gear shifting mechanism, the combination with a reversible motor, a shift rod, means operatively connecting said shift rod to the motor comprising a clutch, a magnet controlling said clutch, a source of power and a contact device comprising a single lever controlling the supply of power to the magnet and to the motor.

4. In a gear shifting mechanism, the combination with a reversible motor, a shift rod, means operatively connecting said shift rod and motor comprising a clutch, and a magnet for actuating the clutch, of a source of power and a switch comprising a plurality of contacts connected with the armature of said motor and said magnet respectively and a movable switch member whereby the magnet may be energized independently of the motor.

5. In a gear shifting mechanism, the combination with a reversible motor, of a shift rod, means for operatively connecting said shift rod with the motor comprising a clutch and electrically controlled means for actuating the clutch and holding the same in predetermined position independently of the motor.

6. In a gear shifting mechanism, the combination with a reversible motor, a shift rod, means operatively connecting said shift rod and motor comprising a clutch mechanism, and means carried by said clutch mechanism for holding the shift rod in its adjusted position after said clutch has been disconnected.

7. In a gear shifting mechanism, the combination with a reversible motor, a shaft driven by said motor and a pinion loosely mounted on said shaft, of a shift rod normally engaging said pinion, a clutch member on said shaft to engage the pinion, means for operating said clutch and means for automatically disengaging the clutch when the shift rod has been shifted a predetermined distance.

8. In a gear shifting mechanism, the combination with a motor, a shaft driven by said motor and a pinion loosely mounted on said shaft, of a shift rod actuated by said pinion, a clutch movable on said shaft to engage the pinion, means comprising an electro-magnet to operate said clutch and means for automatically returning the clutch to its initial position when said magnet is deënergized.

9. In a gear shifting mechanism, the combination with a motor, a shaft driven by said motor and a pinion loosely mounted on said shaft, of a shift rod actuated by said pinion, a clutch movable on said shaft to engage the pinion, means comprising an electro-magnet to operate said clutch, means for forcing said clutch out of engagement, means on said shift rod to disengage the clutch when the shift rod is moved to its predetermined position and means for automatically returning the clutch to its initial position when said magnet is deënergized.

10. In a gear shifting mechanism, the combination with a reversible motor, a gear shift rod operatively connected therewith and means on said shift rod automatically limiting movement thereof in either direction by said motor and adapted to hold said rod in predetermined position.

11. In a gear shifting mechanism, the combination with a reversible motor, a plurality of shift rods, a clutch mechanism connecting said shift rods separately with the motor and a magnet controlling said clutch, of a control device in circuit with said motor and magnet, said device comprising a plurality of fixed contact members and a movable contact member arranged to permit movement of the motor in contrary directions when each of said magnets is energized.

12. In a device of the class described, the combination of a control mechanism, means for actuating said control mechanism, means operatively connecting said mechanism and said actuating means, means controlling said connecting means for maintaining the same normally in inoperative position and electrically energized means operatively connected to said controlling means for moving and holding the same in its operative position.

13. In a device of the class described, the combination with a gear shifting mechanism of a shiftable device designed to be operatively connected to the gear shifting mechanism to change the gear combinations, power means operatively connected to said shiftable device to move the same, and electromagnetically controlled means for locking said device in shifted position.

14. In a device of the class described, the combination with a source of electric energy, a reversible motor, a plurality of electromagnets, a switch including a plurality of separate contacts connected to the armature of said motor, and to each of said electromagnets and a single switch lever adapted to engage said contacts to simultaneously actuate said motor and one of said electromagnets, and means coacting with said switch for automatically breaking the circuit to said motor while permitting the electromagnet to remain magnetized.

15. In a gear shifting device, the combination of means adapted to shift a pair of gears into an interengaging operatively connected position, means constantly acting on said first named means for automatically and promptly returning the same to an inoperative position when free of restraint, a reversible motor, magnetically controlled means for selectively connecting the motor with said first named means to move the same into position to connect the gears and locking means carried by said magnetically controlled means for positively holding said first named means in position to hold the gears in their interengaging operative position.

16. In a gear shifting device, combination of means including an electric motor adapted to shift a pair of gears into an interengaging operatively connected position, mechanical means constantly acting on said first named means for automatically returning the same into an inoperative position, magnetically controlled means for inaugurating the movement of first named means into position to connect the gears, a single control switch for closing the circuit through said motor and for energizing said magnetically controlled means, and means for limiting the movement of said first named means.

17. In a device of the class described, the combination with a gear shifting rod, of means for moving said rod into a gear setting position, a locking device moved by said rod into a locking position and magnetically controlled means for maintaining said device in locked position.

18. In a gear shifting mechanism, the combination with a mechanism containing a casing having a gear shifting rod extending from the same, of a reversible motor, a shaft operatively connected to the motor to be driven thereby, a driving clutch connection between said shaft and said rod, electromagnetically controlled means for moving said clutch into position to connect said shaft and rod whereby the rod may be shifted in either direction longitudinally.

19. In a gear shifting mechanism, the combination with a power shaft, and gear shifting rods, of a clutch for transmitting the rotary movement of said shaft into rectilinear movement of said rods, resilient means tending to return the clutch to its initial position when disengaged from the power shaft and selective means for moving said clutch into engagement with one of said rods.

20. In a gear shifting mechanism, the combination with a power shaft and gear shifting rod, of a clutch for transmitting the rotary movement of said shaft into rectilinear movement of said rod to shift the same and automatically actuated means operable after the initial movement of said rod and automatically actuated means for locking said rod in its shifted position.

21. The combination of a movable member mounted for reciprocatory movement and having two operative and an inoperative positions, of power means for shifting said member longitudinally in either direction into one of its operative positions, a locking device having an element thereof moved by said member into one of the locking positions and magnetically actuated control means for maintaining said member in locked position.

22. In a device of the class described, the combination of a reversible electric motor, a gear shifting rod operatively connected to the movable element of the motor to effect at will either one or two gear combinations, a control switch for selectively controlling the direction of the current through said motor thereby to control the direction of movement of said rod, and resilient means acting on said rod to restore the same to its normal position when free of restraint.

Signed at New York, in the county of New York and State of New York, this 2nd day of July, A. D. 1914.

HOWARD J. MURRAY.

Witnesses:
M. J. COOPER,
S. A. THORNTON.